United States Patent [19]

Willemsen et al.

[11] Patent Number: 4,475,033
[45] Date of Patent: Oct. 2, 1984

[54] POSITIONING DEVICE FOR OPTICAL SYSTEM ELEMENT

[75] Inventors: Herman W. P. Willemsen, Ottawa; Grantley O. Este, Stittsville, both of Canada

[73] Assignee: Northern Telecom Limited, Montreal, Canada

[21] Appl. No.: 356,042

[22] Filed: Mar. 8, 1982

[51] Int. Cl.³ .............................................. G02B 5/14
[52] U.S. Cl. .................... 250/227; 350/6.6; 350/487; 310/10
[58] Field of Search ............... 250/227, 201; 350/6.1, 350/6.2, 6.6, 487, 355, DIG. 3, DIG. 2; 310/10; 335/56, 51, 55

[56] References Cited

U.S. PATENT DOCUMENTS

| | | | |
|---|---|---|---|
| 3,488,531 | 1/1970 | Rosensweig | 310/10 |
| 4,204,742 | 5/1980 | Johnson et al. | 350/487 |
| 4,322,837 | 3/1982 | Mickleson et al. | 350/355 |

OTHER PUBLICATIONS

IBM Technical Disclosure Bulletin, *Latch Relay;* Beausoleil et al., vol. 11, No. 11, Apr. 1969, p. 1467.

*Primary Examiner*—David C. Nelms
*Assistant Examiner*—J. Brophy
*Attorney, Agent, or Firm*—Stuart L. Wilkinson

[57] ABSTRACT

A device for accurately positioning an optical system element uses an array of electromagnets to alter fluid pressure distribution in a mass of ferromagnetic fluid. The pressure redistribution causes movement of an optical system element positioned adjacent to the ferromagnetic fluid. The invention is concerned with particular arrangements of fluid and energizing electromagnets to ensure combined rectilinear and angular movement of the optical system elements. The device has neither the complexity nor the delicacy of known structures used for moving optical system elements.

17 Claims, 5 Drawing Figures

POSITIONING DEVICE FOR OPTICAL SYSTEM ELEMENT

This invention relates to devices for obtaining precise angular and rectilinear movement of an optical system element.

In optical systems, it is often necessary to control the position or velocity of system elements such as light sources, detectors, mirrors, lenses and optical fibers. Such positioning must be extremely precise. For example, an 8 micron diameter laser beam, coupled into a 10 micron optical fiber core with a misalignment of more than one or two microns yields unacceptable coupling losses. In addition to aligning the axes of the fiber and laser beam, it is usually desirable to be able to move the fiber axially towards and away from movement of the laser source. Thus there is need for controlled rectilinear movement of the fiber in three mutually perpendicular directions.

A similar positioning problem arises when using mirror deflectors, for example for laser scanning of optical discs. Here it is necessary to angularly tilt the mirror and also to move the mirror bodily to vary or maintain the optical path length of a light beam incident on the mirror.

Known devices for positioning such optical system elements include pairs of orthogonally-disposed screw adjusters, moving coils, electromagnetic actuators, or piezoelectric devices, each pair capable of moving the fiber in two mutually perpendicular directions. Such devices do not readily permit either controlled movement in the third orthogonal direction or angular movement of the elements. Moreover, such arrangements are complex, delicate, and frequently both difficult to set up and tedious to use.

The present invention avoids some of the complexity and delicacy of known arrangements for moving optical system elements by using materials known as ferromagnetic fluids. As clearly set out in U.S. Pat. No. 3,488,531, ferromagnetic fluids are fluids which become polarized in the presence of a magnetic field with consequent pressure redistribution and, possibly, fluid motion. Typically, ferromagnetic fluids are colloidal or colloid-like fluids comprising a carrier liquid in which extremely fine particles are suspended.

As indicated in the above-mentioned patent, ferromagnetic fluids can be produced by grinding a suitable ferromagnetic body and colloidially dispersing ferromagnetic particles so that the combination has particular fluid properties described for example by Rosenwig et al, "Ferrohydrodynamic Fluids for Direct Conversion of Heat Energy", Joint A.I.CH.E/Institute of Chemical Engineers Meeting, London, June 1965.

According to one aspect of the invention there is provided a positioning device for accurately positioning an optical system element, the positioning device comprising a mass of ferromagnetic fluid; restoration means tending to maintain the mass of ferromagnetic fluid in a stable condition with a predetermined fluid pressure distribution; a non-magnetic body in contact with the ferromagnetic fluid mass; magnetic energizing means for energizing the mass of ferromagnetic fluid to redistribute pressure within the fluid whereby to move the non-magnetic body rectilinearly along a first axis and angularly about a second axis.

Preferably the restoration means can include any one or combination of permanent magnets, electromagnets, gravity, and a fixed support or confining body. Particularly for positioning a mirror, the fixed support body can be a horizontal substrate. Thus the ferromagnetic fluid can be supported on the horizontal substrate with energizing electromagnets below the substrate adapted to produce localized magnetic field perturbations. If the perturbations are distributed non-linearly and cause the ferromagnetic fluid to concentrate at at least three non-linearly distributed locations, then a three-point support is provided for the mirror or other optical system element. By individually varying the height of the ferromagnetic fluid concentrations by differentially energizing the electromagnets, the mirror or other optical system element can be made to tilt or can be bodily lifted relative to the substrate.

Particularly for supporting an optical fiber, the confined body can be a cylinder within which the mass of ferromagnetic fluid is retained to surround the fiber. The fiber can be mounted within a specially shaped body which is itself immersed within the ferromagnetic fluid. By arranging electromagnets around the body, the body and the fiber held thereby, can be made to move in an XY plane perpendicular to the fiber axis. By further arranging groups of individually energizable electromagnets spaced along the axis of the fiber, the body can be made to move such as to tilt the fiber axis. The holding body can be so shaped that differential energization of electromagnets spaced along the fiber axis can cause movement of the fiber also along the Z axis.

Preferably the positioning device includes a servo-loop including an optical transducer for detecting motion of the optical device, a feedback circuit controlled by the optical transducer, a summing device for summing a signal from the feedback circuit and a command signal, and a drive curcuit for independently driving the electromagnets. The optical transducer can, for example, be a position transducer or a velocity transducer. The optical input to the transducer can be derived either from a primary optical beam controlled by the positioning device or from a dedicated secondary optical beam made dependent on the position of the optical system element controlled by the positioning device. The optical transducer can include a quadrant photodetector. The ferromagnetic fluid can be contained within a flexible membrane.

Embodiments of the invention will now be described, by way of example, with reference to the accompanying drawings in which.

Figure 1:
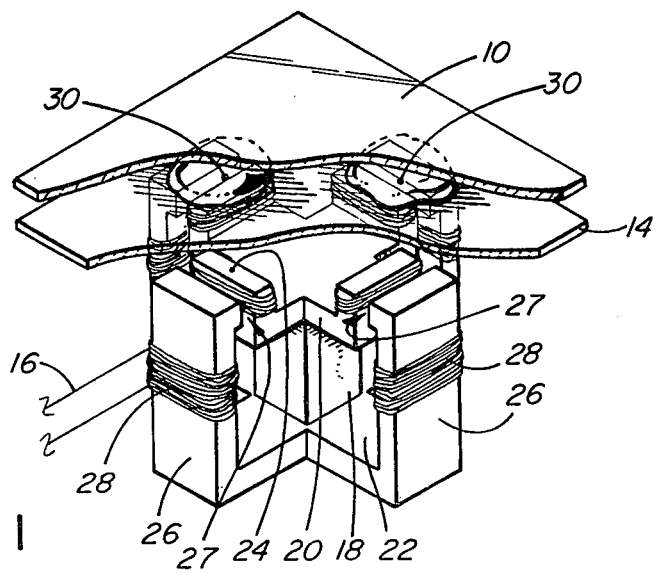
FIG. 1 is a perspective view with part cut away of one embodiment of positioning device in which ferromagnetic fluid is supported on a horizontal substrate.

Referring in detail to FIG. 1, there is shown a mirror 10 resting on a mass 30 of ferromagnetic fluid. The ferromagnetic fluid is supported on a ceramic substrate 14 which is itself mounted over an electromagnet assembly 16. The electromagnets can be energized to redistribute the ferromagnetic fluid mass and so alter the position of the mirror 10.

The electromagnetic assembly 16 is linked to a central permanent magnet 18 having a vertical magnetic axis. The magnet 18 supports an upper cruciform soft iron yoke 20 and is itself supported by a lower cruciform yoke 22. The yokes 20 and 22 have vertical limbs 24 and 26 respectively on which the substrate 14 is mounted. A pole pair 27 is established in the space between each pairing of a limb 24 and a limb 26. Windings 28 surround the limbs 24 and 26 and are connected to a power supply and control circuit (not shown). The mass of ferromagnetic fluid consists essentially of four fluid concentrations 30 which rest upon the upper surface of substrate 14. The fluid concentrations or masses 30 are located one above each of the four pole pairs 27 and are retained in place by the residual magnetic field produced at the pole pairs 27 by the permanent magnet 18. A suitable ferromagnetic fluid is obtainable from Ferrofluidics Inc. under the specification No. A06.

The mirror 10 rests upon the four fluid masses 30, the strength of the residual magnetic field of magnet 18 being sufficient to suspend the mirror at a predetermined height above the substrate 14. Essentially, the magnetic particles within the fluid are attracted towards any region of high magnetic field strength and cause a consequent pressure distribution within the fluid. If the windings 28 are energized, the magnetic field existing at pole pairs 27 is increased and the particles within the mass 30 overlying any particular pole pair are attracted towards the region of maximum field strength. In consequence, the fluid bunches more closely over the pole pairs 27 causing an upward shift of the mirror away from the substrate 14. Conversely, if the magnetic field is weakened, the fluid masses are lowered by a restoring force attributable to a combination of gravity and surface tension. The mirror 10 is thereby lowered. If opposed pairs of the windings 28 are differentially energized or are excited in opposite directions, the mirror tilts. The individual windings 28 can be excited so as to oppose the field due to the magnet 18. Alternatively, the magnet 18 can be dispensed with and each winding 28 maintained partially energized to a threshold level sufficient to support the mirror 10 at a desired height above the substrate 14.

Figure 2:
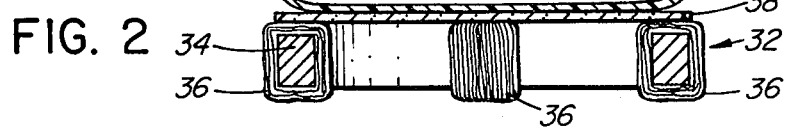
FIG. 2 is a sectional elevation of a second embodiment of positioning device.

In the absence of a permanent magnet such as the magnet 18, the ferromagnetic fluid mass 12 must be otherwise retained on the substrate 14. Referring in detail to FIG. 2, an electromagnetic assembly 32 here comprises a soft iron toroid 34 having four identical circumferentially equispaced windings 36. A glass substrate 38 rests on the toroid 34 and ferromagnetic fluid 40 contained within a flexible pouch 42 rests upon the substrate 38 and itself supports a mirror 44. The pouch ensures that no loss of performance is incurred through wetting of the glass substrate 38 by the fluid 40. Moreover, the pouch 42 permits use of a magnetic fluid having a volatile suspension liquid.

Equal energization of the four windings 36 directs the magnetic fluid 40 into a generally torodial form. As shown in FIG. 2, differential variation in the excitation level of the windings 36 causes one side of the fluid toroid to increase in height compared with a diametrically opposed part causing the mirror 44 to tilt. Suitable control of relative winding excitation permits tilting of the mirror 44 in any direction. Additional windings could be provided at intervals around the toroid, but it will be appreciated that full angular and height control is possible using only four coils with suitable control circuitry.

Figure 3:
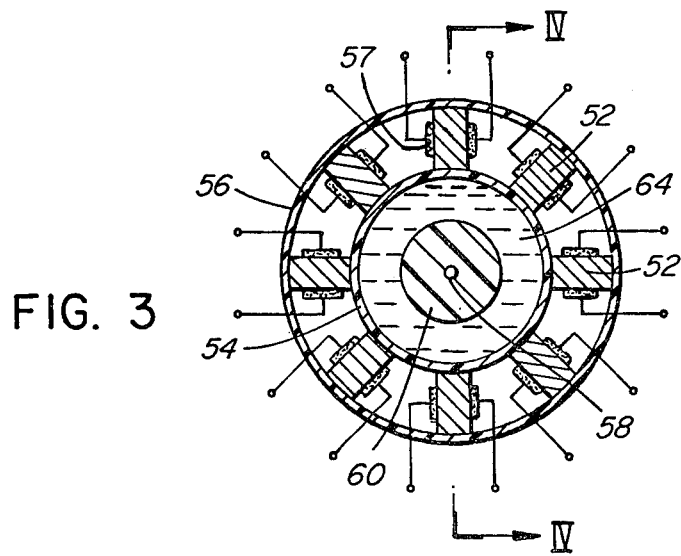
FIG. 3 is a cross sectional view of a positioning device for positioning an optical fiber.
Figure 4:
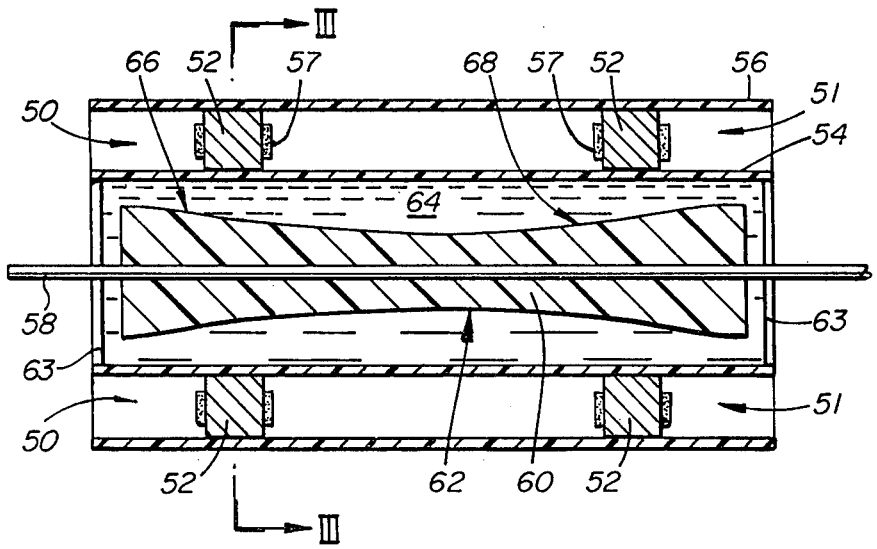
FIG. 4 is a longitudinal section of the FIG. 3 positioning device.

FIGS. 3 and 4 illustrate a third embodiment of the invention which is particularly suitable for displacing an elongate body such as an optical fiber both in mutually othogonal directions and angularly about two othogonal axes.

Two axially spaced sets 50, 51 of radially extending electromagnets 52, are mounted between inner and outer cylinders 54 and 56 respectively, made of non-magnetic material. An optical fiber 58 extends along the axis of the cylinder 54 and is held within a plastic holder 60. The holder has a generally cylindrical configuration, being thinner at its center 62 than at its ends. Flexible radial membranes 63 at the ends of cylinder 54 seal against the fiber 58 and confine a magnetic fluid mass 64 to the interior of the cylinder 54. The holder 60 is immersed within the fluid 64. As in the previous embodiments, the electromagnets 52, which are positioned some distance in from the ends of cylinders 54 and 56, are connected to drive circuits (not shown) enabling windings 57 of the electromagnets 52 to be selectively energized.

Axial movement of the fiber 58 is produced by energizing the windings of one set of electromagnets to a level greater than the other set. Thus if the magnetic field produced by the electromagnets 50 is greater than that produced by the electromagnets 51, a corresponding pressure differential is established within the magnetic fluid 64. Where the magnetic field is higher, the magnetic particles entrained within the fluid 64 move towards the region of increased field strength so producing an increase in pressure on a tapered surface 66 at the left-hand side of the holder 60 and a decrease in the pressure at a tapered surface 68 on the right-hand side of the holder 60. There is a resultant axial force tending to drive the holder 60 and the fiber held by it towards the left.

Movement of the fiber in a plane perpendicular to its axis is achieved by increasing the magnetic field strength on one side of the holder compared to the magnetic field existing on the reverse side. Again, magnetic fluid particles are drawn towards the region of increased field strength causing the holder 60 to be displaced in the opposite direction. If both axially spaced sets 50, 51 of electromagnets are equally energized, the holder moves laterally. If the sets 50 and 52 are differentially energized, the holder and fiber 58 move to orientations in which the fiber axis is angularly inclined to the longitudinal axis of the cylinder 54.

Other holder configurations and electromagnet arrangements can be employed to similar effect. For example, the holder can be a straight cylinder with increased magnetic fluid pressure adapted to act against the end of the cylinder in piston-and-cylinder fashion. The holder/electromagnet assembly of the FIG. 3 arrangement provides five degrees of freedom. By altering the cylindrical form of the holder 60, a sixth degree of freedom can be provided. The positioning device is then universal in nature in the sense that it can, within limitations set by device geometry, be moved in any direction and to any orientation.

A movable body can have additional flexural support such as springs tending to restore the body to a stable position in the absence of an applied magnetic field.

The arrangements described above for obtaining combined rectilinear and angular movement of an optical system element have numerous advantages. Since there is very little friction, extremely small movements are possible. The devices can be made very small making them particularly adaptable for optical systems used in fiberoptics. The magnetic fluid provides inherent damping to eliminate backlash. The fluid has low inertia allowing high speed response, this being particularly important in dynamic control applications where displacement varies continuously as in scanning. The positioning devices, since they use very few mechanical parts, are generally more reliable than known systems for moving optical system elements.

As previously recited, typical applications of these positioning devices are in positioning optical fibers relative to optical switches, lasers, photo-detectors, and other fibers. Alternatively the positioning devices can be used to accurately position the fiberoptic devices relative to a fiber. As well as fiberoptic applications, the positioning devices may find application in the control of mirror beam deflectors for laser beam scanning, in for example optical disc memories. An important application is the use of movable mirrors directly in a laser resonant cavity for the purposes of static and controlled tuning of such structures. Generally the invention is of advantage in optical work where a small positioning device is required with a span of about 100 microns at a resolution of less than 1/1000 and a bandwidth of 1 KHz.

As previously mentioned, the invention is not limited to controlling astatic displacement, but is equally applicable to dynamic displacement control such as in beam scanning. The electromagnetic nature of the apparatus permits relatively simple feedback control as illustrated in the attached schematic view of a feedback circuit in FIG. 5.

Figure 5:
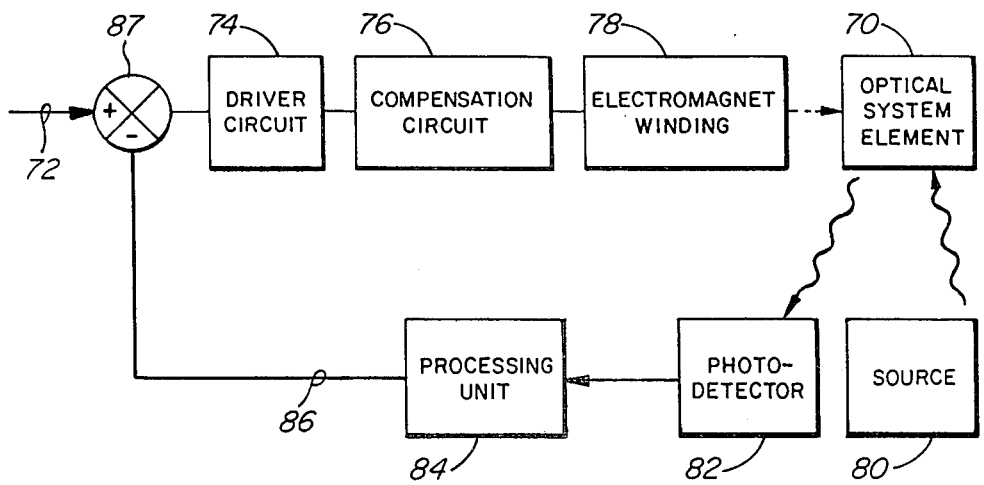
FIG. 5 is a block schematic diagram of a control circuit applicable to positioning devices according to the invention.

Referring in detail to FIG. 5, an optical system element 70 is moved between desired positions by a command signal 72 acting through a driver circuit 74, a compensation circuit 76, and winding 78 of an electromagnet. The electromagnet may be energized to move the optical system element 70 in a manner described in any of the embodiments of FIGS. 1 to 4. Presuming that the optical system element 70 is a mirror, then as shown, a secondary optical beam is generated at a source 80 and is reflected back to a quadrant photodetector 82. The output of the photodetector 82 is taken to a processing unit 84 where a correction signal 86 is generated and is summed with the command signal 72 at network 87. A modified command signal is then fed to the driver circuit 74. A feedback circuit will normally be associated with each of the windings so that movement in any one degree of freedom can be achieved independently of the other degrees of freedom. The compensation circuits 76, which are associated with each of the windings 78 are necessary in order to compensate for differences in performance characteristics of the individual electromagnets. Although as shown, a secondary radiation beam is used for position control, it will be understood that part of a primary beam being controlled by the optical system and being used primarily for another purpose, may be used to generate a correction signal.

The arrangements used have, for ease of design of the servo-loop, all been limited to arrangements in which the electromagnets are energized simultaneously to move the optical element from one fixed position to another. Clearly, if the element is intended to be kept in motion then the electromagnets can be energized in such order as will give the element focus and reorientation desired. Indeed at the expense of a more complex loop, the number of electromagnets and the complexity of holder shape can be reduced. Thus by appropriately ordering the firing of three electromagnet pairs having orthogonally disposed axes, a spherical body can be successfully moved in any direction and to any orientation.

What is claimed is:

1. A device for accurately positioning an optical system element, the positioning device comprising:
   a mass of ferromagnetic fluid;
   restoration means tending to maintain the mass of ferromagnetic fluid in a stable condition with a predetermined fluid pressure distribution, the restoration means including a fixed support body contacting the ferromagnetic fluid mass;
   a non-magnetic body in contact with the ferromagnetic fluid mass;
   magnetic energizing means for energizing the mass of ferromagnetic fluid to redistribute pressure within the fluid whereby to alter the configuration of the ferromagnetic fluid and to alter the position of the non-magnetic body contacting the ferromagnetic fluid mass, the magnetic energizing means capable of moving the non-magnetic body rectilinearly along a first axis and angularly about a second axis.

2. A positioning device as claimed in claim 1, in which the restoration means includes at least one permanent magnet.

3. A positioning device as claimed in claim 1, in which the restoration means includes at least one electromagnet.

4. A positioning device as claimed in claim 1, in which the restoration means includes gravity.

5. A positioning device as claimed in claim 1, in which the fixed support body is a planar substrate.

6. A positioning device as claimed in claim 5, wherein the energizing means are mounted underneath the substrate and are energizable to produce localized magnetic field perturbations distributed non-linearly thereby to cause the ferromagnetic fluid to concentrate at at least three non-linearly distributed locations to provide at least a three-point support for the body.

7. A positioning device as claimed in claim 6, in which the energizing means comprises a plurality of individually energizable electromagnets enabling the localized magnetic field perturbations to be varied to individually vary the height of the ferromagnetic fluid concentrations above the substrate whereby to tilt or lift the body supported thereon.

8. A positioning device as claimed in claim 6, in which the body is a mirror having an upwardly directed reflecting face.

9. A positioning device as claimed in claim 1, in which the body is surrounded by the mass of ferromagnetic fluid.

10. A positioning device as claimed in claim 9, in which the body is shaped to have an optical system element mounted relative thereto.

11. A positioning device as claimed in claim 10, in which the body has a passage therethrough in which passage an optical fiber can be mounted, the passage extending along a predetermined axis in the stable condition of the ferromagnetic fluid.

12. A positioning device as claimed in claim 11, having at least three electromagnets arranged around the mass of ferromagnetic fluid, the electromagnets being individually energizable to move said body in an XY plane perpendicular to said axis.

13. A positioning device as claimed in claim 12, further comprising another group of at least three electromagnets positioned around the mass of ferromagnetic fluid at a position spaced along said axis from the first group whereby the two groups can be independently energized to tilt the body to incline the passage to said axis.

14. A positioning device as claimed in claim 13, in which the body has outer surface portions adjacent the electromagnets inclined to the axis, whereby the groups of the electromagnets are independently energizable to promote longitudinal movement of the body along said axis.

15. A positioning device as claimed in claim 1, further including a servo-loop comprising an optical transducer for detecting motion of the optical device, a feedback circuit controlled by; the optical transducer, a summing device for summing a signal from the feedback circuit and a command signal, and a drive circuit for independently driving the electromagnets.

16. A positioning device as claimed in claim 15, in which optical input to the transducer is derived from a primary optical beam controlled by the positioning device.

17. A positioning device as claimed in claim 1, in which the ferromagnetic fluid is contained within a flexible membrane.

* * * * *